Nov. 17, 1925.

M. T. SKINNER

ROTARY DISK PLOW

Filed Nov. 17, 1924

1,561,618

Inventor
M. T. Skinner,
By John M. Spellman
Attorney

Patented Nov. 17, 1925.

1,561,618

UNITED STATES PATENT OFFICE.

M. T. SKINNER, OF CLEBURNE, TEXAS, ASSIGNOR OF ONE-FOURTH TO JULIAN B. McCAULEY AND ONE-FOURTH TO CHARLES A. NABORS.

ROTARY DISK PLOW.

Application filed November 17, 1924. Serial No. 750,273.

*To all whom it may concern:*

Be it known that I, M. T. SKINNER, a citizen of the United States, residing at Cleburne, in the county of Johnson and State of Texas, have invented certain new and useful Improvements in Rotary Disk Plows, of which the following is a specification.

This invention relates to improvements in agricultural implements and refers particularly to a rotary disk plow.

The object of the invention is to provide a rotary disk plow wherein the disks are revolved at a maximum rate of speed by gearing the drive wheel of the machine to the shafts carrying the rotary disks. The present form of rotary disk plows, so far as I am aware, only permit the disks to rotate by their rolling motion through the soil, and are not geared to the drive wheel.

Another object of the invention is to provide a rotary disk plow which, in addition to the above, shall be of few parts and such parts well balanced and distributed in the plow frame so as to derive the maximum amount of power from the drive wheel or drive axle.

A further object is that the disks have their cutting edges on a wave line to more effectually cut the soil.

The above objects and advantages and a full and clear description of the new and improved plow may be had by reference to the following description, taken in connection with the accompanying drawings forming part hereof and wherein.

Figure 1:
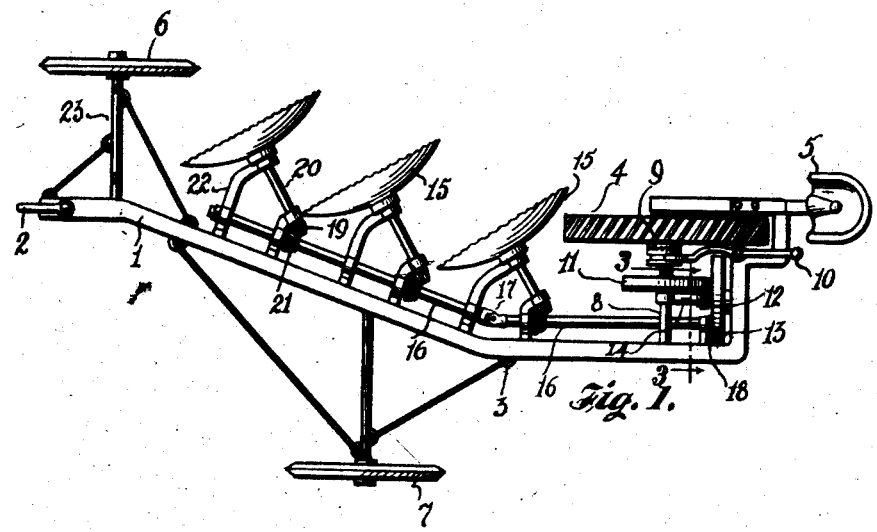
Figure 1 is a top or plan view of the plow.
Figure 2:
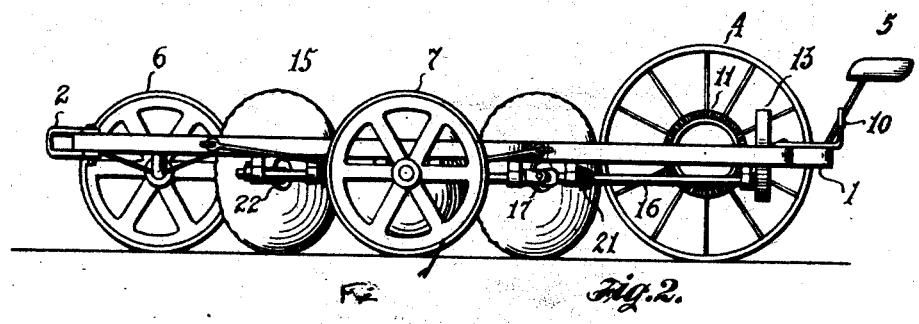
Figure 2 is a side elevational view.

Referring to the drawings more in detail, 1 denotes the frame of the machine, the forward end having a clevis 2 for attaching a team or tractor. From a point slightly beyond the clevis the frame is bent diagonally from a straight line to a point 3 and then assumes a position on a line with the directional movement of the plow. It is then brought around the drive wheel 4 and a seat 5 mounted thereupon. Supporting wheels 6 and 7 are mounted so as to support the forward and middle part as shown in Figure 1.

Referring to drive wheel 4; upon the axle 8 of this wheel is a clutch 9 operated by foot lever 10 to throw the drive wheel into and out of engagement with the one portion of the clutch carried on the axle 8. The inner portion of this axle carries a gear wheel 11 which is in mesh with a pinion gear 12. This latter gear 12 forms an integral part of a large gear 13, rotating on and supported by a shaft 14 and connected to axle 8.

By this arrangement the maximum speed and driving power is derived from the movement of the machine over the ground. The position of the driver's seat also aids in permitting the weight of the driver to bear down upon the drive wheel to further enable it to grip the ground.

Figure 3:
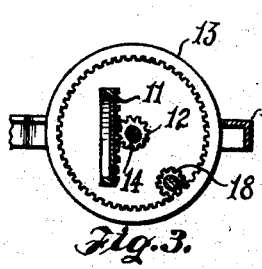
Figure 3 is a detail fragmentary view of the drive wheel gearing.

The means for importing the driving power to the disks 15—15 is obtained by a drive shaft 16, at the angle of which is a universal joint 17. On the rear end of this shaft is a pinion gear 18, see Figure 3, which is meshed with the annular inner teeth of gear wheel 13. This permits the power from the drive wheel greatly multiplied by the arrangement of gears, to impart considerable power to the shaft 16 rotating the disks.

These disks 15—15 are set at an angle to the drive shaft and have bevel gears 19, on shafts 20, in mesh with bevel gears 21 on shaft 16. The disk shafts and drive shafts are held rigidly by the braces 22—22.

It will be noted that the disks 15—15 have their cutting edges on a waving line to provide a better cutting or breaking effect on the soil.

The disks may be raised or lowered from the ground by means of usual levers, not shown, common in a plow of this description, ordinarily attached to a sleeve on the front supporting axle 23.

It should be understood that minor changes and modifications may be made in the arrangement and construction of the plow without departing from the meaning and spirit of the following claim:

A rotary disk plow comprising a frame, supporting wheels carried by the forward end of said frame, a drive shaft journalled within the rear end of said frame and extending transversely thereof, a drive wheel for said shaft, a driven shaft extending longitudinally of and journalled upon said frame, rotary disks operatively connected to said driven shaft, an intermediate driven shaft extending longitudinally of said frame and operatively connected to said driven shaft, a gear wheel journalled upon said drive shaft, a clutch arranged between said gear wheel and drive shaft, means for operatively connecting said gear wheel with said intermediate driven shaft, and a manually controlled lever for operating said clutch.

In testimony whereof I have signed my name to this specification.

M. T. SKINNER.